United States Patent
Hill

[15] 3,676,948
[45] July 18, 1972

[54] FISHING LURE

[72] Inventor: Richard L. Hill, 11140 E. Imperial Highway, Norwalk, Calif. 90650

[22] Filed: Aug. 10, 1970

[21] Appl. No.: 62,348

[52] U.S. Cl. ............................. 43/42.45, 43/35, 43/42.04
[51] Int. Cl. .................................................. A01k 85/00
[58] Field of Search .......... 43/42.04, 42.44, 42.45, 42.48, 43/35

[56] References Cited

UNITED STATES PATENTS

| | | |
|---|---|---|
| 2,480,580 | 8/1949 | Hopkins ......................... 43/42.45 |
| 1,886,116 | 11/1932 | Nolan ............................. 43/42.48 X |
| 3,264,775 | 8/1966 | Nahigian ........................ 43/42.45 X |
| 2,494,093 | 1/1950 | Hill ................................. 43/42.48 |
| 2,881,550 | 4/1959 | Newkirk ......................... 43/35 X |
| 3,483,650 | 12/1969 | Weaver .......................... 43/35 |

Primary Examiner—Samuel Koren
Assistant Examiner—Daniel J. Leach
Attorney—Fowler, Knobbe & Martens

[57] ABSTRACT

A fishing lure for deep water fishing comprises an elongated body, having a specific gravity of not less than 10.5 nor more than 19.3, and diminishing in thickness in opposite direction of its length from a point distant from one end by five-twelfths of its total length. Two generally flat surfaces that are contiguous at the point of maximum thickness and fall away beginning at that point to define the diminution in thickness of the body, form the sides of an included angle of between 164° and 170°. At one end the body is adapted to be joined to a line and at its other end it carries two single hooks freely suspended, facing in opposite directions and in overlapping relation.

3 Claims, 8 Drawing Figures

INVENTOR.
RICHARD L. HILL
BY
FOWLER, KNOBBE
& MARTENS
ATTORNEYS.

FISHING LURE

BACKGROUND OF THE INVENTION

Deep water fishing as a sport has long been popular but devices that carry the hooks to the depths where large fish are to be found have been discouragingly ineffective as a rule and have numerous specific disadvantages. In the past heavy sinkers have been needed in order to troll in deep water for fish, such as salmon, and lures that were attached to lines provided with heavy sinkers were incapable of undergoing realistic movements that would attract fish. The water friction on lighter lures prevents all vertical jigging action at depths exceeding 100 feet of line. Whether in trolling or in bottom fishing the desired lure movement cannot be achieved with lighter lures.

It has generally been the custom to provide lures with hook structures comprised of three hooks rigidly connected together and with their barbed tips presented outwardly from the common shank at 120° angular separation. Treble hooks of this type have a tendency to snag readily in deep reef fishing conditions. Moreover, treble hooks have not been available to hold fish such as sea bass weighing several hundred pounds.

SUMMARY OF THE INVENTION

In accordance with the invention a lure is provided which also serves the purpose of a sinker because it has a specific gravity of not less than 10.5 and under certain circumstances it may be desirable to provide a specific gravity as high as 19.3.

In order that it shall serve as a lure the body is elongated and its thickness diminishes in both directions toward the ends from a point which is distant from one of the ends five-twelfths of the total length of the body. This configuration enables the lure, if lifted a few feet off the bottom at about the same speed as it free falls in the water, to move in a life-like manner that will attract a fish seeking food near the bottom. At the end nearer the point of maximum thickness the lure is provided with means for connecting it to a line. At its other end the lure loosely mounts a ring from which are suspended two single hooks of a size presumed adequate for hooking fish of the type known or expected to abound in the locale where the lure is to be used.

The hooks are so disposed on the ring that they suspend in overlapping relationship and facing in opposite directions. This suspension imparts the ability to slide over obstructions without snagging to a much greater extent than is possible with the rigidly connected treble hooks. When the suspended hooks are seized by a fish the closing mouth presses upon the shanks of the two hooks and tends to move the shanks together and thus to thrust apart and expose the barbed tips of the hooks, thereby to enhance the likelihood that the fish will be caught and firmly held.

DESCRIPTION OF THE DRAWINGS

For a complete understanding of the invention, reference may be had to the following detailed description to be interpreted in the light of the accompanying drawings wherein.

DETAILED DESCRIPTION

Figure 1:
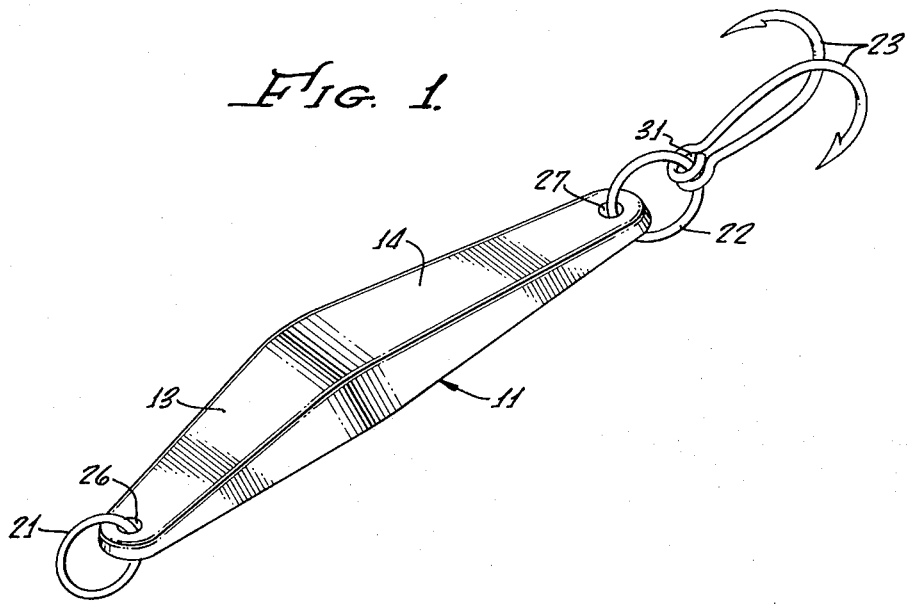
FIG. 1 is a perspective view showing a fishing lure in accordance with the preferred embodiment of the invention.

Referring to the drawings and particularly to FIG. 1, the reference numeral 11 designates generally the body of a fishing lure in accordance with the present invention. The body is elongated and preferably has a specific gravity of at least 10.5 but not exceeding 19.3. It will be recognized that 10.5 is the specific gravity of silver and that 19.3 is the specific gravity of gold. Between these two are a number of semi-precious metals, and one very common and inexpensive metal, namely, lead, which has a specific gravity of 11.3. It will be understood that either a single metal having a specific gravity within the specified range or an alloy of two or more metals, such as lead and tin, lead and silver or lead and gold, may be used. In order to achieve specific gravities in the upper portions of the range, substantial percentages of precious or semi-precious metals will be required.

Figure 2:
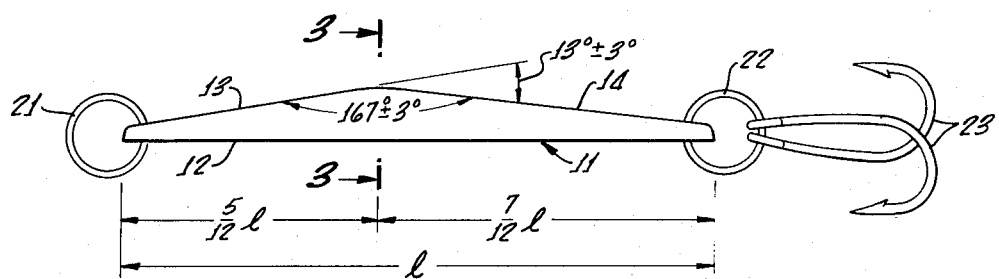
FIG. 2 is an elevational view of the fishing lure shown in FIG. 1.

It will be apparent from FIGS. 1 and 2 that the body of the lure 11 has its maximum thickness at a point nearer to one end than the other, and preferably this point, which coincides with the section, line 3—3 in FIG. 2, is five-twelfths of the total length of the body 11 from one end thereof and accordingly is seven-twelfths of the length distant from the other end. Preferably, the body 11 has one of the surfaces which define the diminution in its thickness flat, shown in FIG. 2 as the lower surface 12. The upper surface then consists of two declining surfaces 13 and 14, preferably generally flat so that the decrease in thickness in both directions along the length of the body from its point of maximum thickness is uniform. It is not necessary that the planes of the surfaces 13 and 14 meet at the point of maximum thickness in an observable line of intersection, but throughout the major portion of their lengths to the ends of the body it is preferred that they be substantially flat. As indicated in FIG. 2, the angle between the surface 14 and an extension of the plane of the surface 13 is preferably 13° ± 3°. Stating this another way, the interior angle included between the surfaces 13 and 14 is preferably 167° ± 3°. If the surfaces 13 and 14 are not essentially flat but have some uniformly distributed convexity then the angles would be measured from one to another of tangents to the two surfaces at points substantially equidistant from the ends of the surfaces 13 and 14 or from one to another of chords subtending the curves of whatever convexity the surfaces 13 and 14 might have.

Figure 3:
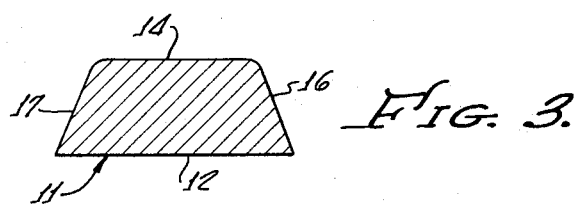
FIG. 3 is a cross-sectional view taken on the line 3—3 of FIG. 2.

As indicated in FIG. 3, the body 11 of the lure has sloping sides 16 and 17, so that the bottom 12 is wider than the top at the point where the section shown in FIG. 3 is taken. It will also be apparent in FIG. 1 that the lure body narrows in width in both directions from its point of maximum width. It should be noted that the slope of the sides 16 and 17 is not of particular significance and in fact the sides might be perpendicular to the surface 12. A lure tends to have a more pleasing appearance by virtue of the sloping sides and they may afford some advantage in the manufacture of the bodies of the lures, such as facilitating removal from casting molds. Also, the lure body could be of uniform width, from end to end, instead of narrowing.

The location of the point of maximum thickness and the angle between the surfaces 13 and 14, do have important significance, particularly in relation to the specific gravity of the body. The body is provided with any convenient means, such as a ring 21 for connecting it to a line, and with any convenient means such as a ring 22 at the other end for supporting hooks 23. The means for connecting the lure to a line, namely the ring 21 is at the end nearer to the point of maximum thickness. As is shown in FIG. 1, the ring 21 may be a closed ring extending through an aperture 26 at one end of the body 11 of the lure and the ring 22 may be a closed ring extending through an aperture 27 at the other end of the body of the lure. The lure is intended for fishing in deep water, either trolling, or fishing near the bottom at depths to several hundred feet. Particularly when fishing in a more or less stationary position, sometimes called still-fishing, it is desirable to raise and lower the lure several feet and frequently, such action sometimes being called "jigging," in order to attract fish. With lighter lures the water friction minimizes or eliminates all vertical or jigging type of action at a line distance of 100 or more feet of line, when trolling, and when still-fishing the lure sinks so slowly due to water friction on the line that it does not attract fish. A combination of the specific gravity specified herein and the shape of the lure in terms of diminution in thickness at specified rates from the specified point, has been found to produce a realistic type of movement of the lure that attracts fish when trolling. The same combination of specific gravity and form of the lure have been found to provide a realistic movement of the lure in a still-fishing situation if the lure is lifted off the bottom for a distance of 2-8 feet, as an example, at about the same speed as it free-falls back to the bottom.

In the matter of hooks, it has been a common practice to associate with fishing lures rigidly interconnected hooks in sets of three, having a common shank, or having their shanks secured together and with their barbed points facing outwardly and spaced apart 120°. Such hooks, being exposed in this way, have a considerable tendency to snag in deep reef fishing conditions. Also, such hooks in sizes adequate to hold large fish, such as sea bass weighing several hundred pounds, have not been available.

Figure 4:
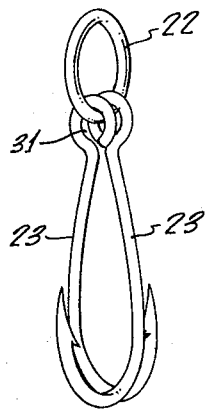
FIG. 4 is a perspective view showing the freely suspended hooks of the fishing lure shown in FIGS. 1 and 2.

In accordance with the present invention, two single hooks 23 are provided. As is apparent, particularly in FIGS. 1 and 4, each of the hooks 23 has at the end of its shank an aperture or eye 31 which is entered by the ring 22. The eye 31 may be formed by bending the shank of the hook into a loop which will receive the ring 22 or, in the case of very large hooks it might be a hole drilled through the shank at its end, which may or may not be flattened, as required, and the eye may be threaded onto the ring 22 before the ring is closed. In either case, the axis of the eye 31 preferably lies in the plane of the hook, so that two hooks may be mounted on the ring 22 to rest, one against the other when freely suspended as in FIGS. 4 and 5, with the inner faces of their shanks facing each other so that the barbed points are presented in opposite directions and the curved portions of the hooks rest one against the other. Each hook may have its shank and barbed tip confined to a plane or the tip may be slightly offset laterally, as indicated in FIG. 4, perhaps 10° to 20° relative to the shank of the hook. The dimension of the eye 31 in each hook relative to the diameter of the wire from which the ring 22 is formed is preferably such that the hook will hang freely and slide freely on the ring 22 but will twist only slightly on the axis of the shank relative to the ring, and thus will tend to hang flat against the other hook.

Figure 5:
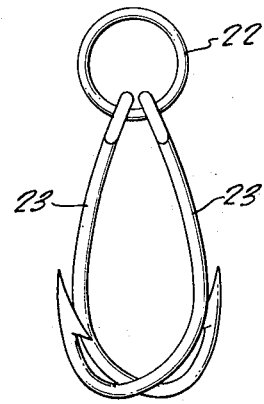
FIGS. 5, 6 and 7 are elevational views showing progressively the action of the hooks when their shanks are brought together as by the closing of the mouth of a fish that has seized the lure.
Figure 6:
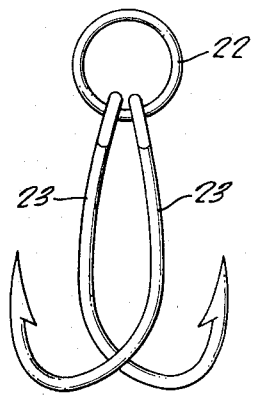
Figure 7:
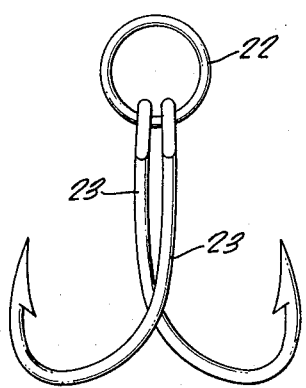

With the hooks 23 freely suspended and lying against each other as shown in FIGS. 4 and 5, they have relatively little tendency to snag on objects encountered in the water. It appears that the shank of either one tends to guide the tip of the other away from an object on which the hook might snag. However, when the hooks are seized by a fish the closing mouth or the interior surfaces of the mouth, pressing upon the shanks of the two hooks 23 as they are in FIG. 5, tends to move the shanks together as indicated in FIG. 6, one hook sliding against the other and their barbed tips being moved outwardly apart until they reach the ultimate position with the ends of the shanks that are carried by the ring 22 brought together and the hooks and the barbed tips fully thrust apart, as shown in FIG. 7, to securely engage and retain the fish.

Figure 8:
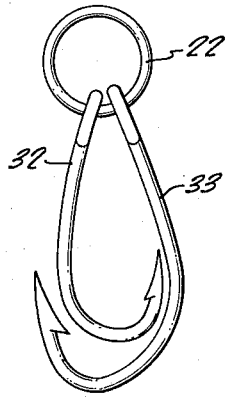
FIG. 8 is an elevational view showing an alternative arrangement of hooks.

With offset tips and with hooks of the same size, as shown in FIGS. 4-7, it has been found to be possible for the hooks to reach a condition of suspension with the tip of each inside the shank of the other, rather than outside as in FIGS. 4 and 5. This is a mutually blocking condition and pressure exerted upon the shanks will not cause the tips to be thrust apart. However, the water currents, and the movement of the lure in a jigging or trolling operation by the angler results in generally continuous movement of the hooks and any such blocking of one by the other will be only momentary. The possibility of the hooks becoming interlocked, even momentarily, may be overcome by making one of the hooks slightly smaller than the other to the extent that when they are freely suspended the smaller may pass through the larger. Such an arrangement is shown in FIG. 8, in which the smaller and larger hooks have been designated 32 and 33 respectively. These hooks cannot become interlocked, and pressure exerted on the outsides of their shanks, as by the mouth of a fish, will cause their barbed tips to be thrust apart, in the same manner as the hooks in FIGS. 5 to 7.

What is claimed is:

1. A fishing lure comprising:
   an elongated body having a specific gravity of not less than 10.5 and not more than 19.3 and having its thickness dimension bounded at one end by a substantially flat surface and having at the opposite end of said thickness dimension a longitudinal profile comprising two substantially straight lines declining toward the plane of said flat surface and forming between said lines an internal included angle of 167° plus or minus 3° with its apex distant from one end of the body by five-twelfths of the length of the body;
   means at the end of the body nearer said apex for connection of the body to a line; and
   at least one barbed hook carried by the body at the other end thereof.

2. A fishing lure in accordance with claim 1 in which the body diminishes in its width dimension toward both of its ends from the point of its maximum thickness dimension.

3. A fishing lure comprising:
   an elongated body having a specific gravity of not less than 10.5 and not more than 19.3 and having its thickness dimension bounded at one end by a substantially flat surface and bounded at the opposite end of the thickness dimension by boundary lines declining with uniformly distributed convexity toward said substantially flat surface in opposite directions of the length of the body from a point distant five-twelfths of the length of the body from one end thereof such that chords joining the extremities of said boundary lines form an included angle of 167° plus or minus 3°;
   means at the end of the body nearer said apex for connection of the body to a line; and
   at least one barbed hook carried by the body at the other end thereof.

* * * * *